United States Patent [19]
Kryzhanovsky

[11] 3,856,384
[45] Dec. 24, 1974

[54] OPTICAL MIRROR
[76] Inventor: Iosif Ivanovich Kryzhanovsky, Krasnaya ulitsa, 20, kv. 6, Leningrad, U.S.S.R.
[22] Filed: Mar. 16, 1973
[21] Appl. No.: 342,319

Related U.S. Application Data
[63] Continuation of Ser. No. 71,612, Sept. 11, 1970, abandoned.

[52] U.S. Cl. .................. 350/310, 350/7, 350/288
[51] Int. Cl. .............................................. G02b 5/08
[58] Field of Search .......... 350/288, 6, 7, 299, 310, 350/303, 304

[56] References Cited
UNITED STATES PATENTS
1,988,952  1/1935  Meyer................................ 350/310
2,464,141  3/1949  Maier................................. 350/310
3,600,257  8/1971  Reinhardt.......................... 350/310

Primary Examiner—Ronald L. Wibert
Assistant Examiner—Michael J. Tokar
Attorney, Agent, or Firm—Waters, Roditi, Schwartz & Nissen

[57] ABSTRACT

A light-weight optical mirror in the form of a thin glass layer baked with a carrier base made of a refractory metal having a softening temperature exceeding that of the glass layer by more than 100°C and a linear thermal expansion coefficient very close to that of the glass layer. A reflecting coating is applied to the external surface of the glass layer after baking it with the carrier base.

2 Claims, 2 Drawing Figures

PATENTED DEC 24 1974　　　　　　　　　　　　　　3,856,384

OPTICAL MIRROR

This application is a continuation application of Ser. No. 71,612; filed Sept. 11, 1970, now abandoned.

The present invention relates to light-weight optical mirrors employed in astronomical instruments, optical scanning devices and other optical systems.

The known mirrors of this type comprise a base made of optical glass and a reflecting coating applied on the polished surface of the optical glass.

In order to reduce the weight of the optical mirrors, particularly in large-size astronomical instruments, a construction was proposed consisting of two members baked to each other, the materials of both these members having approximately the same thermal expansion coefficient, so that the deforming stresses do not appear therebetween within the region of operating temperatures. One of the members serves as a carrier base while the other member is a glass layer with a reflecting coating applied on the polished surface thereof on the side opposite to the carrier base. In these mirrors the carrier base is made of foam glass or cellular glass components. The thickness of the glass layer exceeds 10 mm.

Metal arbours are used for mounting the known optical mirrors.

The known optical mirrors have considerable dimensions and weight, which are increased by the presence of the arbours, and are characterized by a low mechanical strength, particularly under conditions of vibration and impact loads. Furthermore, considerable thicknesses of the glass materials ranging from 1/6 to 1/10 of the diameter of the mirror result in poor thermal resistance of these mirrors under conditions of thermal shocks.

The above-said disadvantages of the known optical mirrors cause great difficulties in making large-size astronomical instruments, high-speed scanning devices and aircraft optical instruments.

Also known in the art are optical mirrors made of metals with polished working surfaces. However, the process of manufacture of the working mirror surfaces is very complicated and labour-consuming and does not provide for the required quality of the working surfaces in large-size mirrors.

The specific object of the present invention is to provide a light-weight optical mirror which has high mechanical strength and thermal resistance, coupled with a high quality of the working surface inherent in the polished glass mirrors.

These and other objects are attained owing to the fact that in the optical mirror with an external reflecting coating in which a glass layer is baked to a carrier base, according to the invention, the carrier base is made of a refractory metal whose softening temperature exceeds that of the glass layer by more than 100°C, and having a thickness less than 6 mm.

Owing to the proposed solution of the problem there is provided a high specific rigidity and strength of the optical mirror while the mounting metal arbours or frames become unnecessary, as their part is played by the carrier base itself. This fact makes it possible to considerably reduce the thickness, and therefore, the weight of the optical mirror.

It is expedient that in the proposed optical mirror the thickness of the glass layer is within the range of 0.1 to 0.6 mm. In this case the thermal resistance and the impact strength of the mirror are considerably increased.

Other objects and advantages of the invention will be apparent from the following detailed description of exemplary embodiments of the invention with reference to the accompanying drawings, in which.

Figure 1:
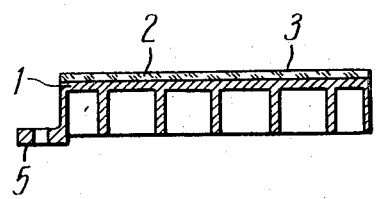
FIG. 1 is a sectional view of the optical mirror according to the invention.

The optical mirror shown in FIG. 1 comprises a carrier base 1 baked with a glass layer 2. A reflecting coating 3 is applied on a polished surface of the glass layer 2 which is up to 6 mm thick.

The metal base 1 is made of a refractory metal having a thermal expansion coefficient close to that of the glass layer so that there are no deforming stresses therebetween within the region of operating temperatures. Besides, the metal of the carrier base must be so selected that its softening temperature exceeds the softening temperature of the glass layer by more than 100°C to keep the shape of the mirror in the process of baking. The materials of the carrier base and of the glass layer can be chosen from Table 1 giving examples of such combinations.

The carrier base 1 has a shape and dimensions which provide for the required rigidity and mechanical strength thereof at predetermined loads.

Figure 2:
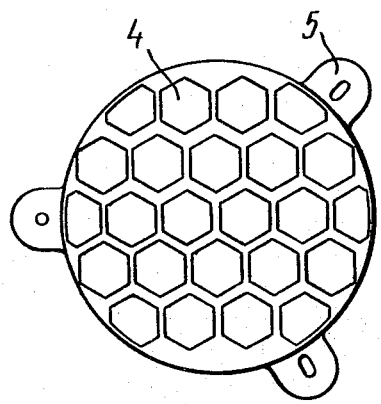
FIG. 2 is a bottom view of the mirror shown in FIG. 1.

One of the possible shapes of the carrier base is a honeycomb shape (FIG. 2) in which blind holes 4 are made in the carrier base, the thickness of the hole bottoms ranging from 1/12 to ⅛ of the cross section of the hole. Such a shape makes it possible to considerably reduce the weight of the mirror while keeping the high strength and rigidity of the carrier base. The mirror has supporting projections 5 with worked fitting surfaces and openings for securing the mirror and on the carrier base.

If the base is made of a titanium alloy with a thickness

Table 1

| Carrier base | | | | Glass layer | |
|---|---|---|---|---|---|
| Material in wt.% composition | Thermal expansion coefficient $\alpha \times 10^7$ from +20° to 100°C | Softening temperature, °C | Material composition in wt.% | Thermal expansion coefficient $\alpha \times 10^7$ from +20 to 100°C | Softening temperature, °C |
| Titanium alloy 3Al 1.5 Mn, the rest being Ti with structure "beta-tited" (to 2% beta-stable) | 83 | 1000 | $SiO_2$–52; $B_2O$–18.8; $Al_2O_3$–7.8; $As_2O_3$–0.2 $K_2O$–6.8; $KHF_2$–14.4 | 83 | 550 |

Table 1 — Continued

| Carrier base | | | Material composition in wt.% | Glass layer | |
|---|---|---|---|---|---|
| Material in wt.% composition | Thermal expansion coefficient $\alpha \times 10^7$ from +20° to 100°C | Softening temperature, °C | | Thermal expansion coefficient $\alpha \times 10^7$ from +20 to 100°C | Softening temperature, °C |
| Beryllium | 111 | 1050 | $P_2O_5$–63.1; $Al_2O_3$–6.2; $ZnO$–20.2; $K_2O$–9.6; $V_2O_5$–0.90 | 108 | 430 |
| Steel C=0.03; Ni=7.45 Cr = 32.5; Fe the rest being | 112 | 1300 | $P_2O_5$–63.1; $ZnO$–20.2; $V_2O_5$–0.90; $Al_2O_3$–6.2; $K_2O$–9.6 | 108 | 430 | of the glass layer is within 0.1 to 0.6 mm, a very strong and heat resistant mirror is provided withstanding temperature drops from −60°C to +150°C.

As is well known, titanium and beryllium have a low specific weight, namely between 1.86 and 4.507 grams per cm³, which greatly reduces the weight of the inventive mirrors.

The above-described example of making the optical mirror is not intended to limit the scope of the present invention. The mirror construction may be modified in making some specific optical instruments.

In the process of manufacture of the optical mirror according to the present invention, the first step consists in the selection of a metal and a glass having approximately the same thermal expansion coefficients and a corresponding difference in the softening temperatures. After making the carrier base, a thin glass layer is baked thereon. The working of the carrier base is effected depending on the required shape of the mirror without grinding and polishing the faces to which the glass layer is baked.

The baking of the glass layer with the metal base is carried out at a temperature higher than the glass softening temperature. In this case the glass layer can be produced by melting glass powder in a vacuum on the surface of the heated metal base. The baking can also be effected by placing a glass sheet on the carrier base with subsequent heating of these components in a heating oven.

On baking the carrier base with the glass layer, the temperature of the oven is set approximately 300°C higher than the glass softening temperature. In this case there is provided a strong connection of the carrier base with the glass layer.

Now after the baking and cooling the article directly in the oven, the glass layer is ground and polished to a chosen thickness and required accuracy of the surface. Then a reflecting coating is applied on the polished surface in the same way as in the case of making the known mirrors.

I claim:

1. A light-weight optical mirror, suitable for high-speed scanning systems, comprising the combination of a thin glass layer not exceeding 6 millimeters in thickness, with a carrier base made of a refractory metal with a low specific weight between 1.86 and 4.507 grams per cm³, constituting a rigid frame onto which said glass layer is baked and with which it is fused, with the exclusion of a frame and the like member; said refractory metal having a softening temperature exceeding that of said glass layer by more than 100°C, and a thermal expansion coefficient so close to that of said glass layer that deforming stresses do not appear therebetween within the region of operating temperatures; and a reflecting coating applied to a polished external surface of said glass layer, combining high mechanical strength and rigidity, as inherent in said refractory metal, with excellent thermal resistance and impact strength, as imparted by said reflecting coating to the resulting combination of said metal base and said glass layer.

2. The optical mirror as defined in claim 1, in which said polished glass layer has a thickness of between 0.1 and 0.6 mm.

* * * * *